United States Patent
Yang et al.

(10) Patent No.: US 7,553,014 B2
(45) Date of Patent: Jun. 30, 2009

(54) METHOD AND APPARATUS FOR ATTACHING SPECTACLE FRAME COMPONENTS AND LENSES

(76) Inventors: Wah Kiang Yang, 82 Genting Lane, #06-05, Singapore 349567 (SG); Andong Zhang, Unit 20C, 16-20 Hereward Street, Maroubra, New South Wales 2035 (AU)

( * ) Notice: Subject to any disclaimer, the term of this patent is extended or adjusted under 35 U.S.C. 154(b) by 0 days.

(21) Appl. No.: 11/662,918

(22) PCT Filed: Sep. 14, 2005

(86) PCT No.: PCT/SG2005/000313
§ 371 (c)(1),
(2), (4) Date: Mar. 15, 2007

(87) PCT Pub. No.: WO2006/031205
PCT Pub. Date: Mar. 23, 2006

(65) Prior Publication Data
US 2007/0216854 A1    Sep. 20, 2007

(30) Foreign Application Priority Data
May 4, 2005    (SG) ................................ 200502765
Sep. 15, 2005    (SG) ................................ 200405075

(51) Int. Cl.
G02C 1/08    (2006.01)

(52) U.S. Cl. .......................... 351/92; 351/90; 351/116; 351/156

(58) Field of Classification Search ................... 351/90, 351/91, 92, 93, 94, 95, 96, 97, 116, 156, 351/157, 111, 118, 119, 41
See application file for complete search history.

(56) References Cited

U.S. PATENT DOCUMENTS 2,551,144 A * 5/1951 Lindemann et al. ........... 351/97
6,890,073 B2 * 5/2005 DiChiara et al. .............. 351/90

* cited by examiner

*Primary Examiner*—Hung X Dang
(74) *Attorney, Agent, or Firm*—Rosenberg, Klein & Lee

(57) ABSTRACT

A spectacle frame comprising a spectacle frame front, the spectacle frame front comprising a pair of spaced apart and opposed arms, each of the pair at least one of the arms having an outer end thereof remote from an upper portion of the spectacle frame front, the outer end of at least one arm of the pair of arms comprising a lens retainer integral therewith for gripping and retaining a lens between the pair of spaced apart and opposed arms.

13 Claims, 22 Drawing Sheets

METHOD AND APPARATUS FOR ATTACHING SPECTACLE FRAME COMPONENTS AND LENSES

REFERENCE TO RELATED APPLICATION

Reference is made to our earlier international patent application number PCT/SG2005/000048 filed 18 Feb. 2005 for the invention entitled "Spectacle Frames", the contents of which are hereby incorporated by reference.

FIELD OF THE INVENTION

This invention relates to a method and apparatus for attaching spectacle frame components and lenses of spectacles and refers particularly, though and exclusively, to such a method and apparatus for attaching spectacle frame components and lenses without use of screws or similar fasteners.

BACKGROUND TO THE INVENTION

In spectacle frames, frame components, and frame components and lenses, are usually attached to each other by screws. This requires great accuracy in the locating and drilling of the holes. It also increases the number of components, and can make life difficult for optical technicians when assembling frames, inserting or removing lenses, or repairing frames. For attaching a frame component to the lens, particularly for rimless frames, or partially rimless frames, if there is an error, or adjustment is required, a new lens may have to be made. This is time consuming for the technician and relatively expensive to the consumer.

Also, spectacle frames assembled without screws or use of soldering, have been made with a front, and two temples, all being made from moulded acrylic or plastic releasably secured together using a complex arrangement requiring special tools. This is inconvenient for opticians, who would find it much easier if they could insert lenses into, and remove temples from fronts without requiring special tools. Furthermore, to provide spring functionality in the temples normally requires a separate spring.

SUMMARY OF THE INVENTION

According to a first preferred aspect there is provided a spectacle frame front comprising a pair of spaced apart and opposed arms, each of the pair of arms having an outer end thereof remote from an upper portion of the spectacle frame front, the outer end of at least one arm of the pair of arms comprising a lens retainer integral therewith for gripping and retaining a lens between the pair of spaced apart and opposed arms The pair of arms may be at least one of: depending from the upper portion, extending upwardly from a lower portion of the spectacle frame front, extending laterally of the spectacle frame front, and forming a rim. The lens retainer may be at least one of: teeth to grip the lens, a needle to grip the lens, and a pin to locate in a corresponding hole in the lens. The lens may have a groove extending around its periphery, the lens retainer engaging the lens in the groove. The pair of arms may taper towards each other towards the outer ends. The outer ends may be spaced apart by a distance less than a maximum lateral width of the lens.

According to a second preferred aspect there is provided a spectacle frame comprising a front and a pair of temples, the front having a side member at each end thereof, each side member comprising an engagement member for releasably yet securely engaging a receptor of a temple for enabling the temple to be releasably attached to the front.

The front may further comprise a split rim, the rim being split at the side member, the side member also being split in alignment with the split in the rim along a common split line for enabling the rim to be opened along the split for the insertion and removal of a lens. The receptor may retain the split rim in a fully closed position when the engagement member is located in the receptor.

According to a third preferred aspect there is provided a spectacle frame comprising:
 (a) a front;
 (b) a side member at each end of the front;
 (c) a pair of rims to which the side members are attached;
 (d) each rim and side member being split along a common split line for enabling the rim to be opened along the split line for the insertion and removal of a lens; and
 (e) a pair of temples, each for engagement with one of the side members for retaining the common split line closed.

Each side member may comprise an engagement member for releasable yet secure engagement with a receptor of the temple.

For the second and third aspects, the engagement member may be bifurcated and may comprise an upper member and a lower member with a gap therebetween, the upper member and the lower member having at least one barb at an end thereof remote from the front. The receptor may comprise an upper bracket for releasably yet securely receiving the upper member, a lower bracket for releasably yet securely receiving the lower member, and an elongate slot passing through the receptor between the upper bracket and the lower bracket. The spectacle frame may further comprise a button for engaging the elongate slot and the gap in the manner of a snap fit. The upper member and the lower member may be movable relative to each other from a first engaging position wherein the barbs engage the receptor, to a second position for enabling the engagement member to be inserted into and released from the receptor. The button may engage the gap to prevent the movement of the upper and lower members. The side members may extend rearward of the front.

According to a fourth preferred aspect there is provided a spectacle frame comprising a front, a pair of temples extending rearward of the front at each end thereof, each temple having a cord extending therethrough and into the front for hinged connecting the temple with the front.

The temple may be moulded around the cord and/or the front may be moulded around the cord.

The cord may pass through a first hole in an upper portion of the front, the cord having a nose pad attached to a front end thereof remote from the temple. The cord may extend along the upper portion and through a second hole in the upper portion of the front, the first hole being remote from the temple, and the second hole being adjacent the temple. The cord extending along the upper portion may be: over a front surface of the upper portion, in a groove in the front surface, moulded into the upper portion, in a groove in a top surface of the upper portion, and in at least one conduit on a rear surface of the upper portion.

The cord may be a flexible metal thread, and the flexible metal may be beta titanium or stainless steel.

In accordance with a fifth preferred aspect there is provided a spectacle frame assembly comprising at least one temple, a clip and a front. The clip may be mouldable or receivable in a recess in a side end piece of the front. The temple is releasably attached to the clip to enable the temple to be releasably attached to the front. The clip may be a spring clip to provide a spring functionality for the at least one temple.

The clip may comprise:
(a) a base;
(b) a curved upper portion integral with the base and extending over the base; and
(c) an upturned lip at an outer end of the curved upper portion for assisting in providing control of movement of the at least one temple of the spectacle frame.

The clip may further comprise a pair of spaced-apart and generally parallel arms extending upwardly from each side of the base, each arm preferably being identical in design, aligned with each other, and having a pin hole. A narrow gap may be formed between the curved upper portion and the base such that when the clip is under compression due to movement of the at least one temple about the clip, the curved upper portion may contact the base to form a closed loop. The control of movement may comprise the providing of spring functionality.

A sleeve may be used between the pins of the at least one temple and the arms, the sleeve being for locating in the pin holes. The sleeve may comprise a generally hollow, cylindrical body with an annular rim at an inner end thereof.

The temple may comprise:
(a) a temple end;
(b) an upper pin extending upwardly adjacent he temple end;
(c) a lower pin extending downwardly adjacent the temple end; and
(d) a slot extending rearward from the temple end forming two arms, the slot being able to be compressed by finger pressure to enable the pins to engage in pin holes in the front.

The temple may further include a temple end offset portion offset inwardly of the temple end, the slot extending rearward beyond the temple end offset portion, the slot tapering in height from the temple end for at least the full extent of the temple end offset portion.

The curved upper portion may be adapted to be contacted by a temple end for providing the control of movement, and the clip may be integral with the front.

According to a sixth preferred aspect there is provided a spectacle frame assembly comprising: at least one temple, a clip and a front, the clip comprising a curved upper portion in a recess in a side end piece of the front, the at least one temple being releasably attachable to the clip for enabling a spring effect on the at least one temple when the at least one temple is moved from a first position to a use second position.

At least one sleeve may be used between laterally extending pins of the at least one temple and the arms, the sleeve being for locating in the pin holes. The sleeve may comprise a generally hollow, cylindrical body with an annular rim at an inner end thereof. Each of the sleeves may locate in a hole extending laterally of the recess.

According to a seventh preferred aspect there is provided a clip comprising:
(a) a base;
(b) a pair of spaced-apart and generally parallel arms extending upwardly from each side of the base, each arm preferably being identical in design, aligned with each other, and having a pin hole;
(c) a curved upper portion integral with the base and extending over the base; and
(d) an upturned lip at an outer end of the curved upper portion for assisting in providing control of movement of at least one temple of a spectacle frame. The control of movement may comprise providing spring functionality.

The control of movement may be spring functionality, and the curved upper portion may be adapted to be contacted by a temple end for providing the control of movement.

The spectacle frame may incorporate any combination of two or more of the above aspects.

BRIEF DESCRIPTION OF THE DRAWINGS

In order that the invention may be fully understood and readily put into practical effect, there shall now be described by way of non-limitative example only preferred embodiments of the present invention, the description being with reference to the accompanying illustrative drawings in which.

DETAILED DESCRIPTION OF PREFERRED EMBODIMENT

Figure 1:
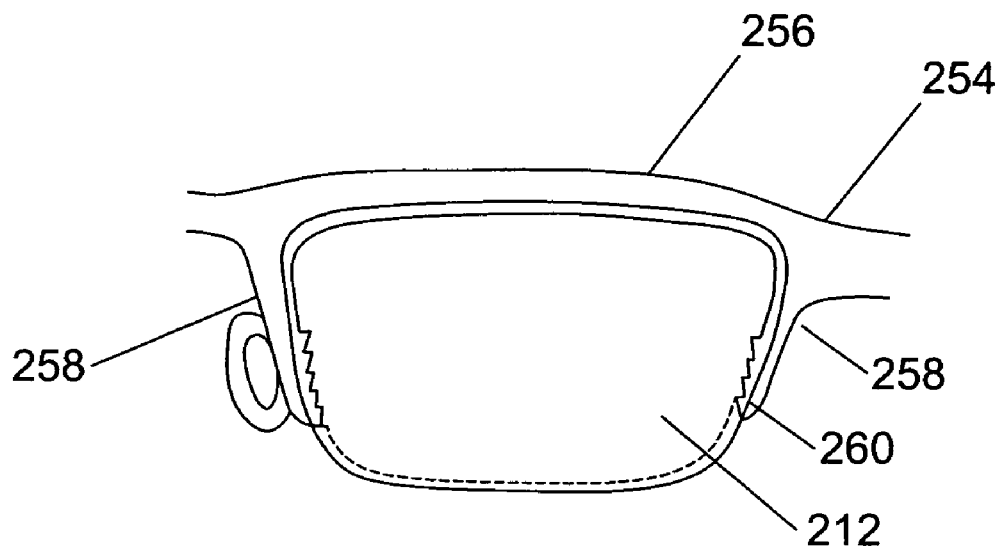
FIG. 1 is a front view of a first embodiment.
Figure 2:
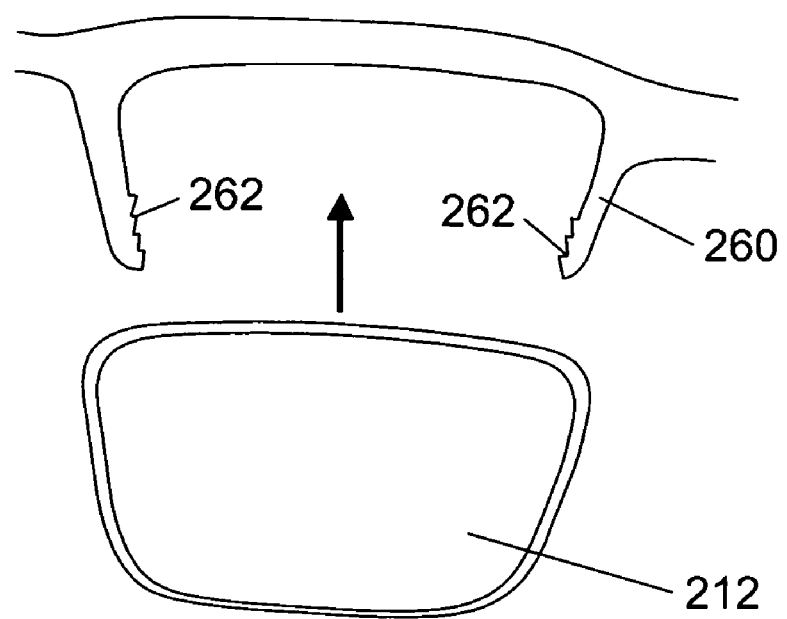
FIG. 2 is a view corresponding to FIG. 1 of the first embodiment prior to insertion of a lens.
Figure 3:
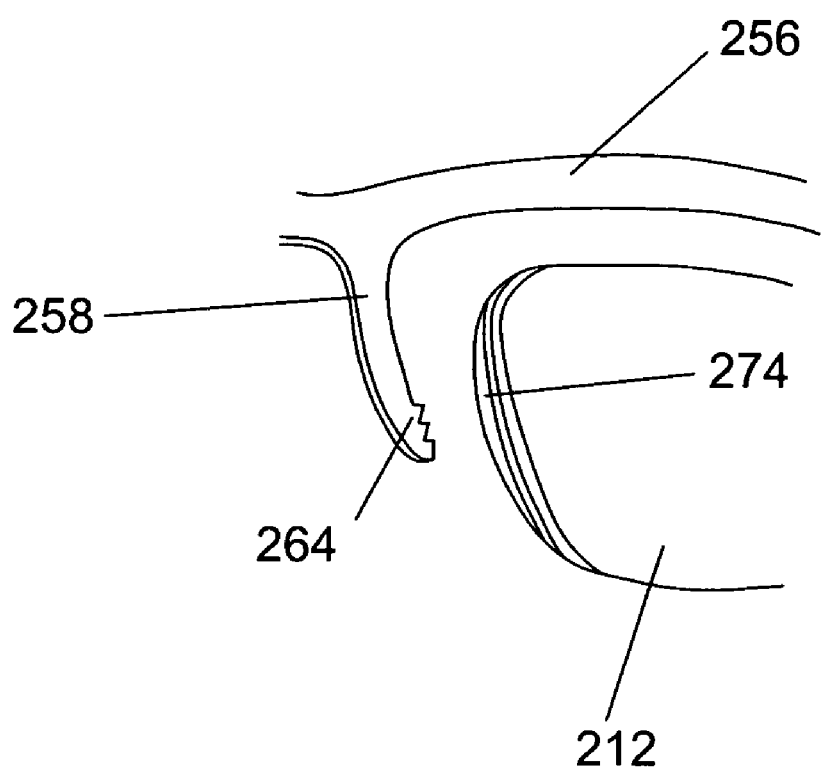
FIG. 3 is an enlarged view of a portion of FIG. 2.
Figure 4:
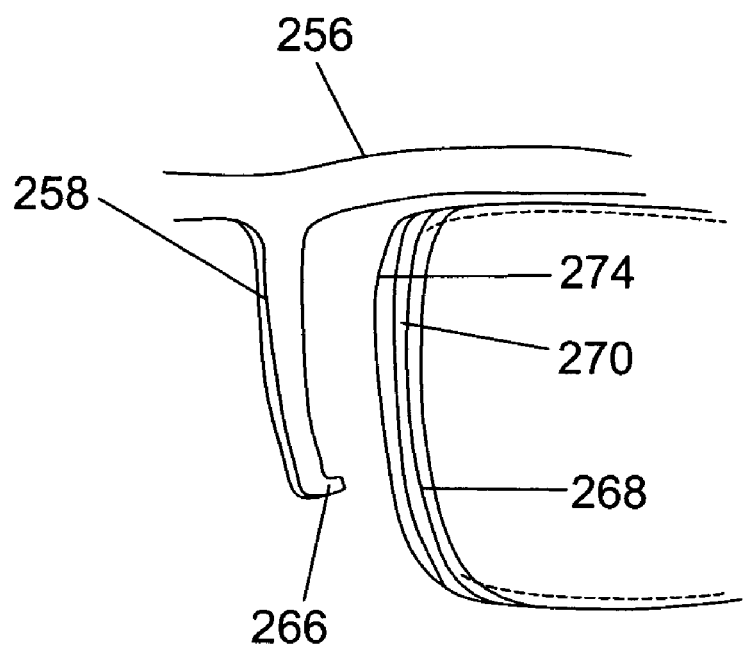
FIG. 4 is a view corresponding to FIG. 3 of a first variation of the first embodiment.
Figure 5:
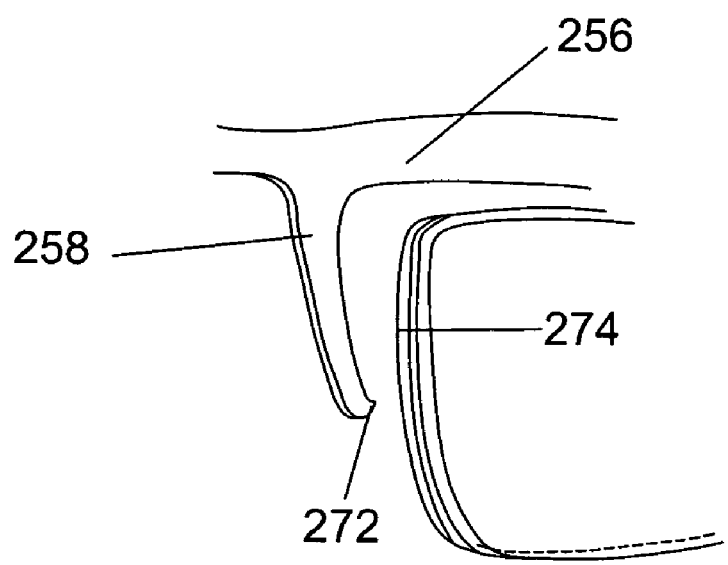
FIG. 5 is a view corresponding to FIG. 3 of a second variation of the first embodiment.

To first refer to FIGS. 1 to 5, there is shown a first embodiment having a half frame 254 in which is located a lens 212. Two spaced apart and opposed arms 258 depend from an upper portion 256 of half frame 254. Arms 258 are spaced apart to releasably receive between them the lens 212. As such they generally converge away from the upper portion 256. At the lower end 260 of each arm 258 is an integral lens retainer 262. The lens retainer 262 is to releasably grip the lens 212 to assist arms 258 retaining the lens 212 between them. The lens retainer 262 may be at the lower end 260 of one arm 258 or both of them. The lens retainer 262 may be a plurality of teeth 264 such as, for example, saw teeth; a pin 266 engaging in a pre-formed or pre-drilled corresponding hole 268 in the side 270 of lens 212; or a sharpened pin or needle 272 to grip the side 270 of lens 212. Preferably, side 270 of lens 212 has a groove 274 therein in which hole 268 is formed or drilled, and in which the teeth 264 and needle 272 can engage.

When the lens 212 is to be inserted, the half frame 254 is flexed to separate the arms 258; or arms 258 are flexed by moving the lower ends 260 away from each other. Lens 212 is inserted and the flexure released. The lens retainer 262 grips or engages lens 212 to hold it in place. If half frame 254 is of a relatively thin material, or has a relatively thin edge, it will engage in groove 274 to assist in retaining lens 212 in half frame 254. The removal of lens 212 is the reverse of the above procedure.

As lenses 212 are normally somewhat wedge or elliptically shaped when viewed from the front, their width at the lower ends 260 of arms 258 is less than their width further up the arms 258. As such, the lens 212 will not tend to fall out of arms 258. Provided at least one of the arms 258 tapers inwardly of the lens 212 before insertion of the lens 212, sufficient retaining force will be exerted on lens 212 to retain it in position.

It is also preferred that the arm 258 to which the nose pads 286 are applied has a taper such that it reflects the general shape of a human nose. In that way the arm 258 will generally not be seen by a wearer.

Figure 6:
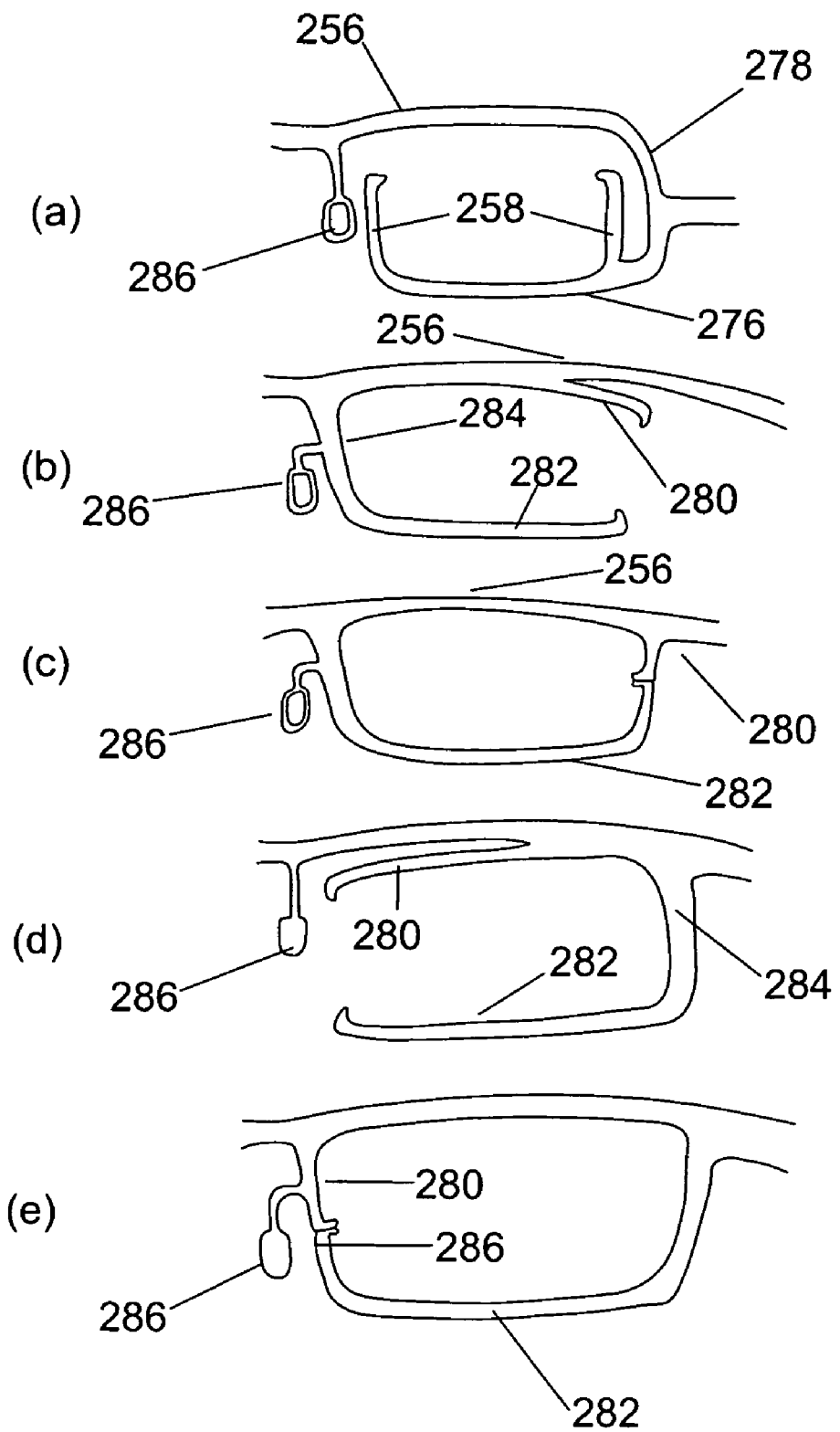
FIG. 6 is a front view of a several further variations of the first embodiment.

FIG. 6 shows several variations of the first embodiment. In FIG. 6(a), there is a lower frame portion 276 from which arms 258 extend upwardly. The lower portion 276 is connected to upper portion 256 by a linking arm 278. The operation and construction of arms 258 is as described above.

FIG. 6(b) has the arms 258 extending laterally or sideward with upper arm 280 extending downwardly and laterally from upper portion 256, and lower arm 282 extending laterally from arm 284. The construction and operation of arms 280, 282 are as described above.

In FIG. 6(c), the lower arm 282 is somewhat L shaped and extends outwardly from arm 284 to form an arm that is somewhat U shaped. The lens retainer is at the end of arm 282. The other arm 280 extends downwardly from upper portion 256 towards, and meeting, the end of arm 282. Arm 280 is relatively short so that the two arms 280, 282 meet at 286. By separating the two arms 280, 282 the lens 212 can be inserted therebetween. In this way the frame appears to be like a full rim frame.

FIG. 6(d) is the mirror image of FIG. 15(b), and FIG. 15(e) is the mirror image of FIG. 15(c).

Figure 7:
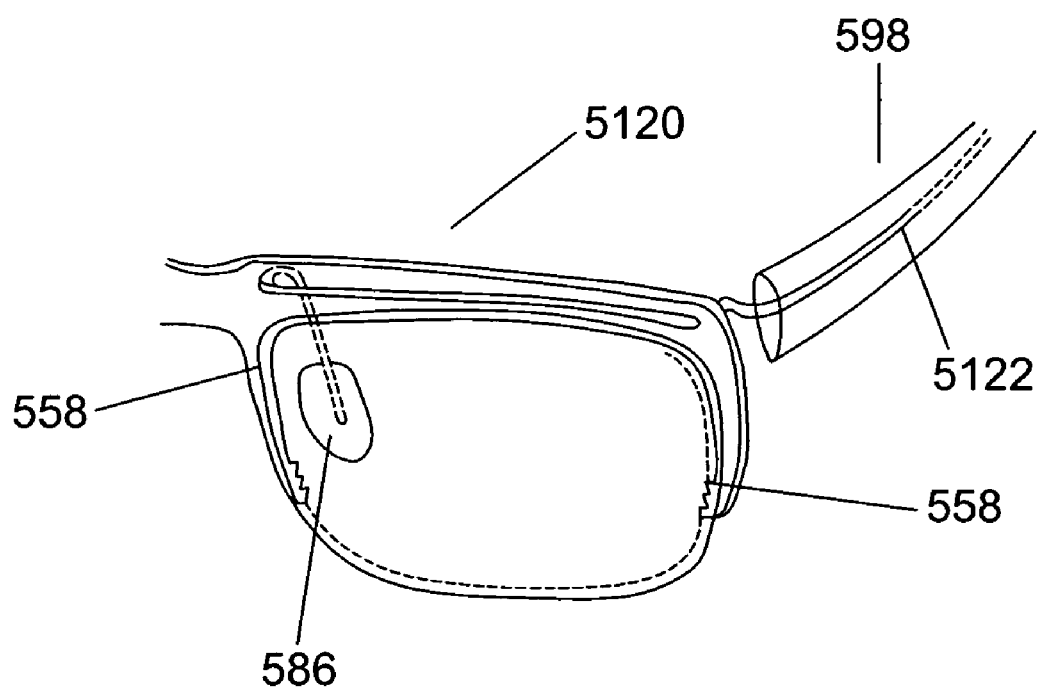
FIG. 7 is a partial front perspective view of a second embodiment.
Figure 8:
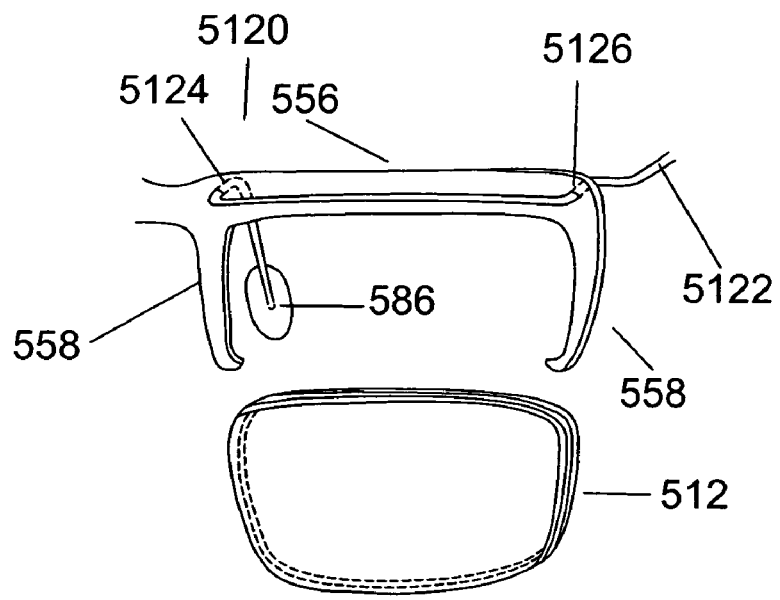
FIG. 8 is a partial front view of the second embodiment prior to insertion of the lens.
Figure 9:
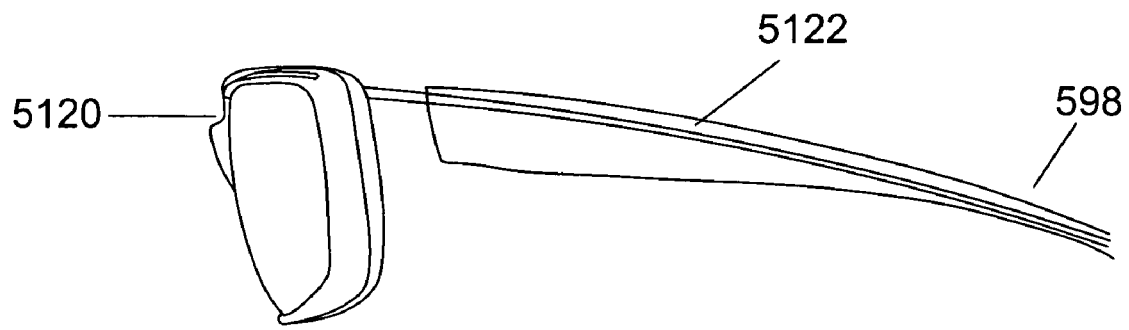
FIG. 9 is a side view of the second embodiment.

FIGS. 7 to 9 show a second embodiment. The front 5120 may be as described above. Here, however, the temple 598 is attached to front 5120 by use of a cord or thread 5122. The cord or thread 5122 may be of any suitable material such as, for example, stainless steel, beta titanium, or the like. The cord or thread 5122 has the nose pad 586 at one end. It passes through a first opening 5124 in upper portion 556 of front 5120 and along front 5120. In that way it acts as a decorative feature for front 5120. The cord or thread 5122 also passes through a second opening 5126. The cord or thread 5122 has temple 598 formed around it such that the cord or thread 5122 and the temple 598 are the one, unified assembly. This may be by moulding a suitable material over the cord or thread 5122. For example, it may be acetate, plastics, epoxy, or the like. By using this assembly, the cord or thread 5122 acts to secure the temple 598 to the front 5120, is the strength of the temple 598, and acts as a hinge for the temple 598 and the temple 5122. If the temple 598 is of a relatively transparent or translucent material, the cord or thread 5122 will act as a further distinguishing feature. The nose pad 586 may be attached to the cord or thread 5122 in any known or suitable manner including, but not limited to, screws, adhesives, being moulded thereto, or the like.

Figure 10:
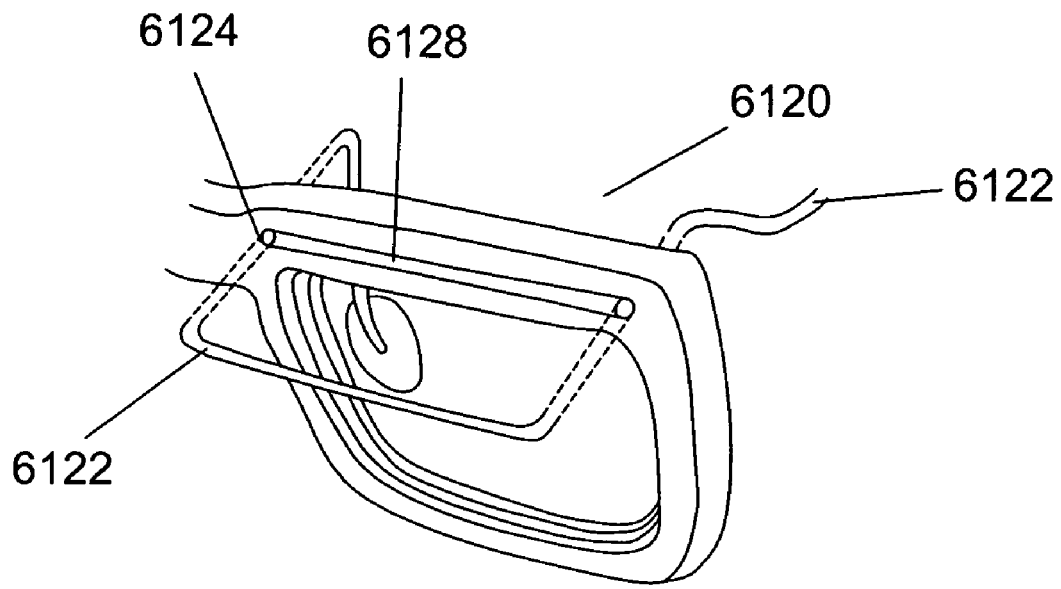
FIG. 10 is a partial front perspective view of a third embodiment during assembly.
Figure 11:
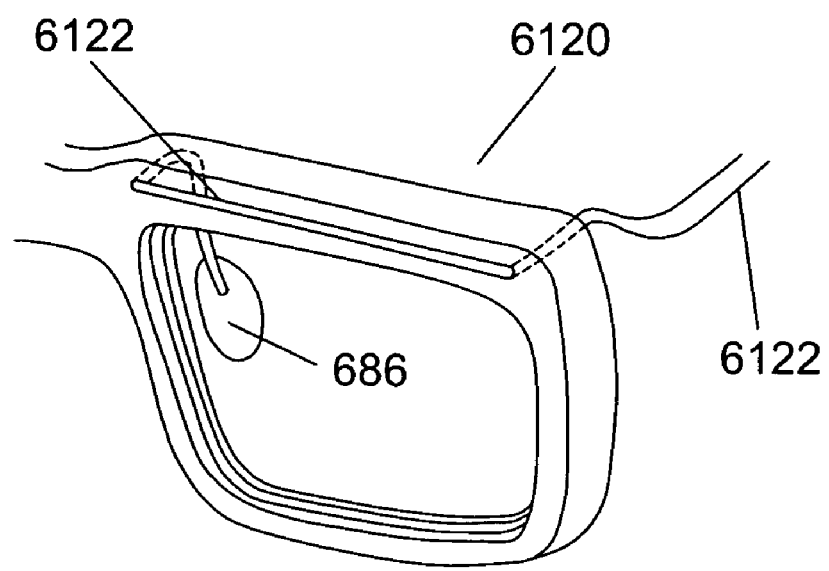
FIG. 11 is a view corresponding to FIG. 10 at the completion of the assembly step.
Figure 13:
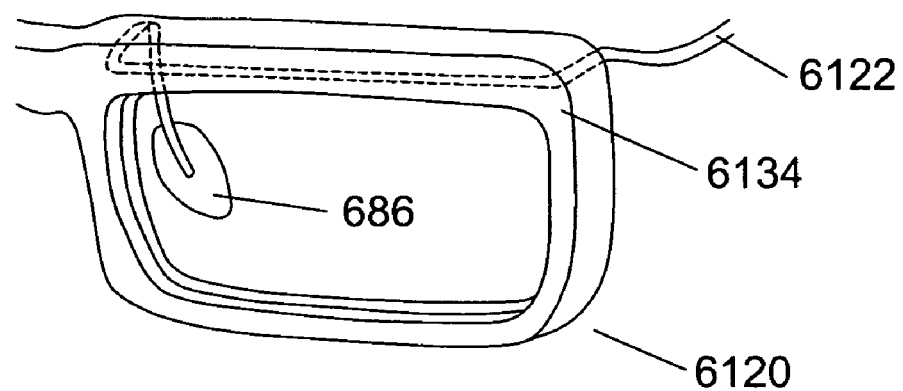
FIG. 13 is a view corresponding to FIG. 11 of a second variation of the third embodiment.
Figure 14:
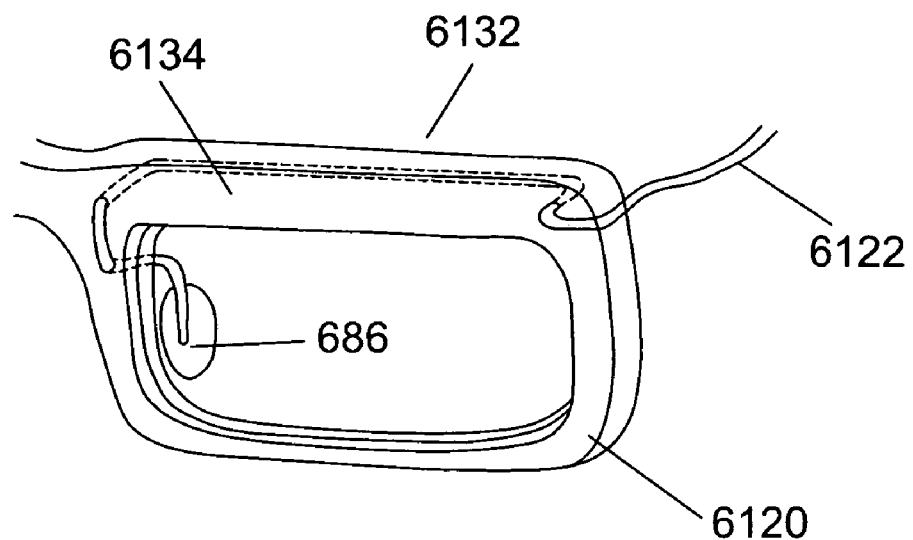
FIG. 14 is a view corresponding to FIG. 11 of a third variation of the third embodiment.
Figure 15:
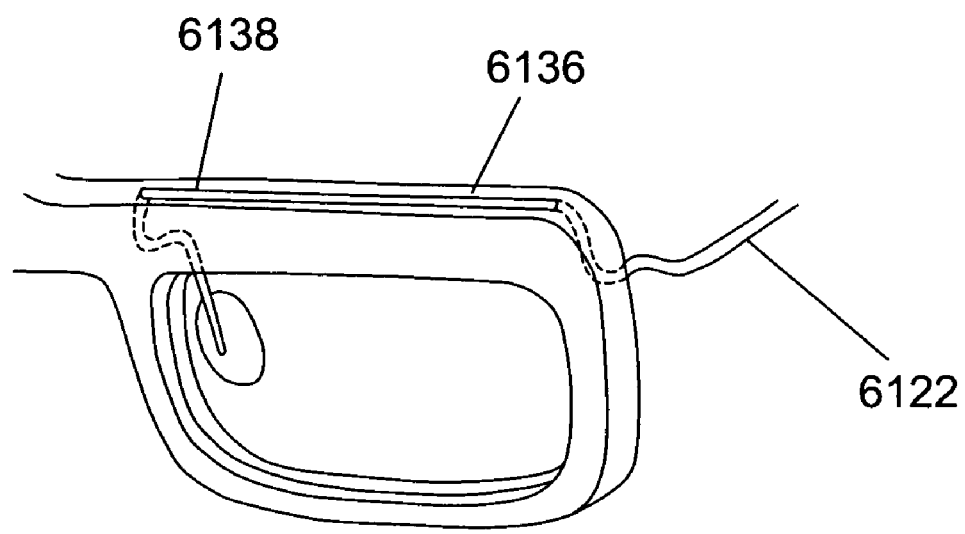
FIG. 15 is a partial rear perspective view of a fourth variation of the third embodiment.

FIGS. 10 to 15 show a third embodiment that is similar to the second embodiment. In FIGS. 10 and 15 the front 6120 has an elongate groove 6128 connecting the first and second openings 6124, 6126. This means the cord or thread 6122 is relatively flush with front 5120 when assembly is complete.

Figure 12:
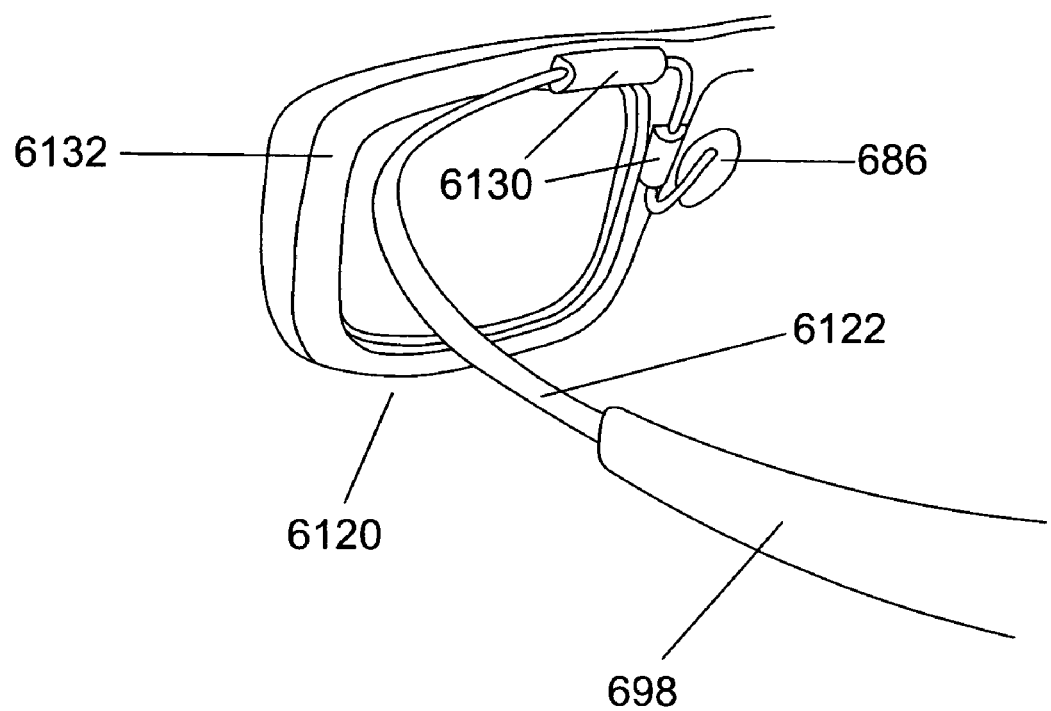
FIG. 12 is a view corresponding to FIG. 11 of a first variation of the third embodiment.

In FIG. 12 the front 6120 has at least two tubular conduits 6130 on the rear surface 6132 of front 6120 and through which the cord or thread 6122 passes, preferably with a relatively tight fit. A further conduit may be provided adjacent temple 698.

FIGS. 13 to 15 show the situation where the front 6120 is moulded around cord or thread 6122 during the manufacturing process. This may be towards a front surface 6134 of the front 6120 (FIG. 13), towards the rear surface 6132 (FIG. 14); or towards or along the top 6136 (FIG. 15). The cord or thread 6122 may locate in a groove 6138 in top 6136.

Figure 16:
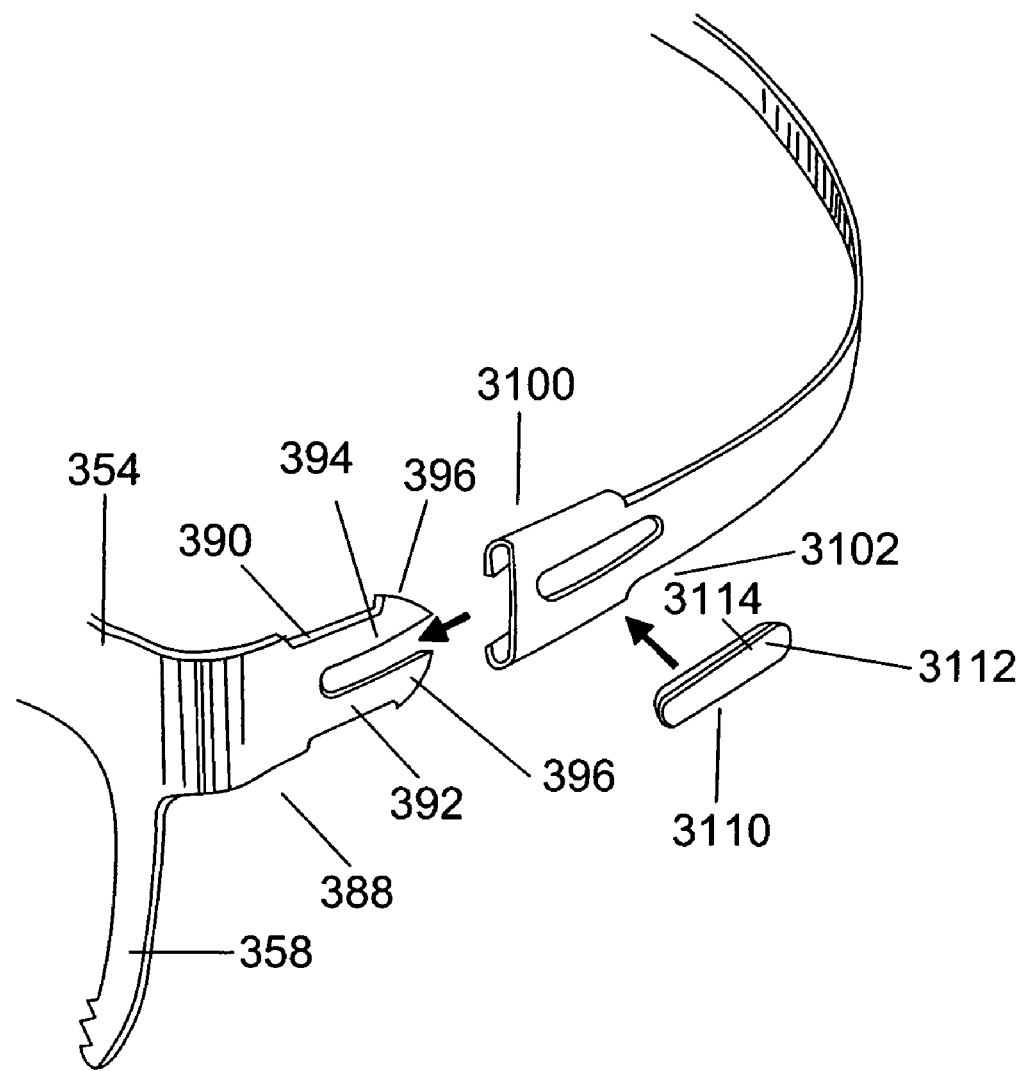
FIG. 16 is a partial, exploded front perspective view of a fourth embodiment.
Figure 17:
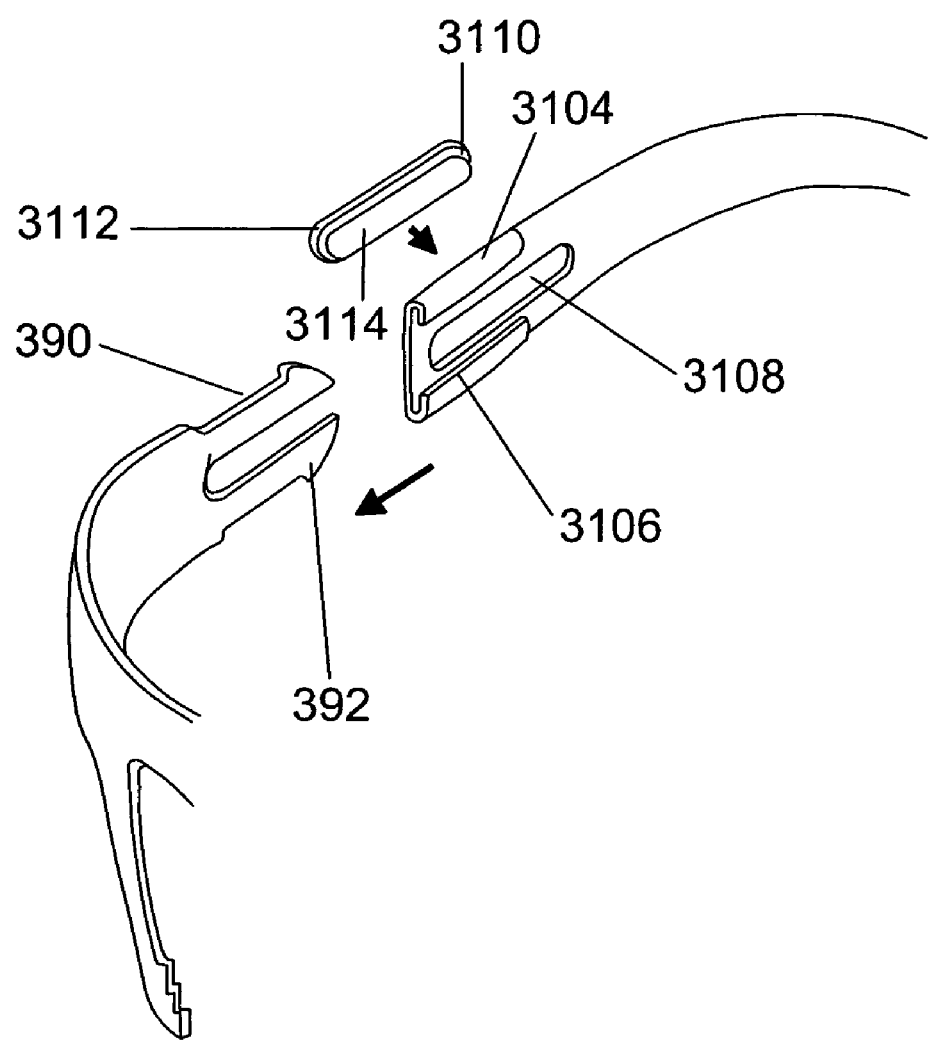
FIG. 17 is a rear perspective view corresponding to FIG. 16.

FIGS. 16 and 17 show a fourth embodiment where the half frame 354 has an integral side member 388 extending rearward thereof. The side member is bifurcated to form upper member 390 and lower member 392 with a gap 394 between them, and each member 390, 392 has a barb 396 at the end thereof.

Temples 398 have a corresponding receptor 3100 at their front end 3102. The receptor 3100 has L-shaped upper and lower brackets 3104 and 3106 respectively, as well as a longitudinally extending elongate slot 3108. To assemble the temple 398 with half frame 354 (or with a full frame, or a pseudo full frame of, for example, FIGS. 15(c) and (e)), the side member 388 is engaged with receptor 3100 in a sliding manner. Barbs 396 force the two members 390, 392 together by compressing gap 394 until receptor 3100 is fully engaged over side member 388, whereupon barbs 396 engage behind upper and lower brackets 3104, 3106. When in this position, gap 394 and slot 3108 are aligned.

A locking button 3110 may be inserted through slot 3108 in the manner of a snap fit. The button 3110 has an enlarged head 3112 that is larger than slot 3108 so it won't pass through slot 3108. The body 3114 of button 3110 passes through slot 3108 and engages in gap 394. In this way, the members 390, 392 may not be moved closer together and thus temple 398 is securely, yet releasably, held on to frame 354. To remove temple 398, the button 3110 is removed, barbs 396 moved towards each other until they disengage from brackets 3104, 3106, and the temple 398 removed. Button 3110 may be used for trademark material as the head 3112 may have printed and/or embossed thereon the trademark identifying the origin of the spectacle frame 354.

Figure 18:
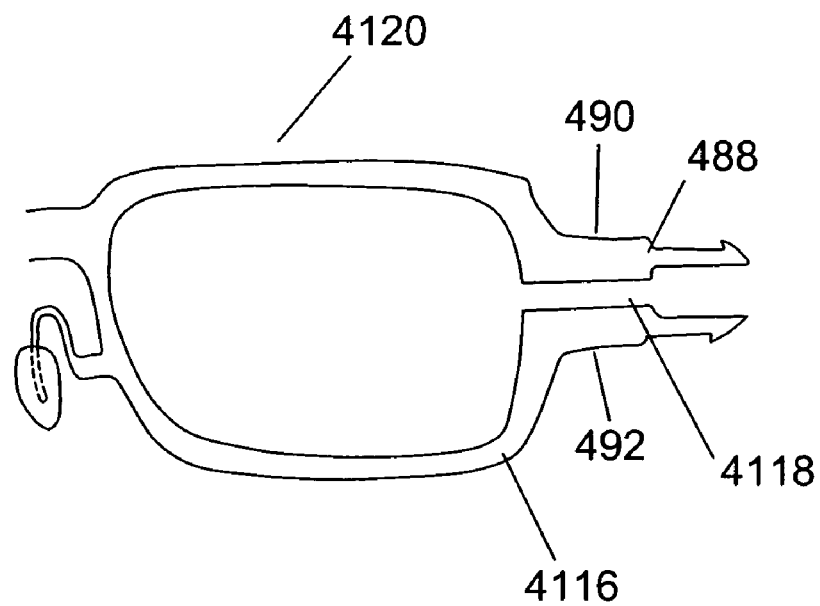
FIG. 18 is a partial front view of a fifth embodiment.
Figure 19:
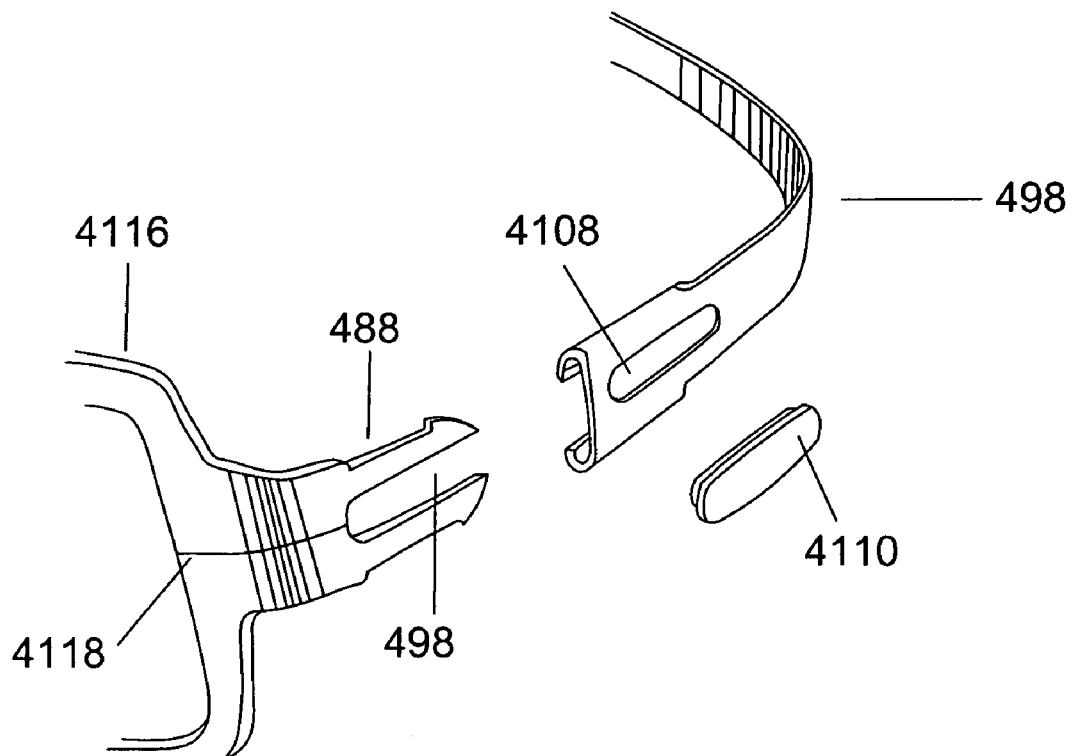
FIG. 19 is a partial, exploded front perspective view of the fifth embodiment.
Figure 20:
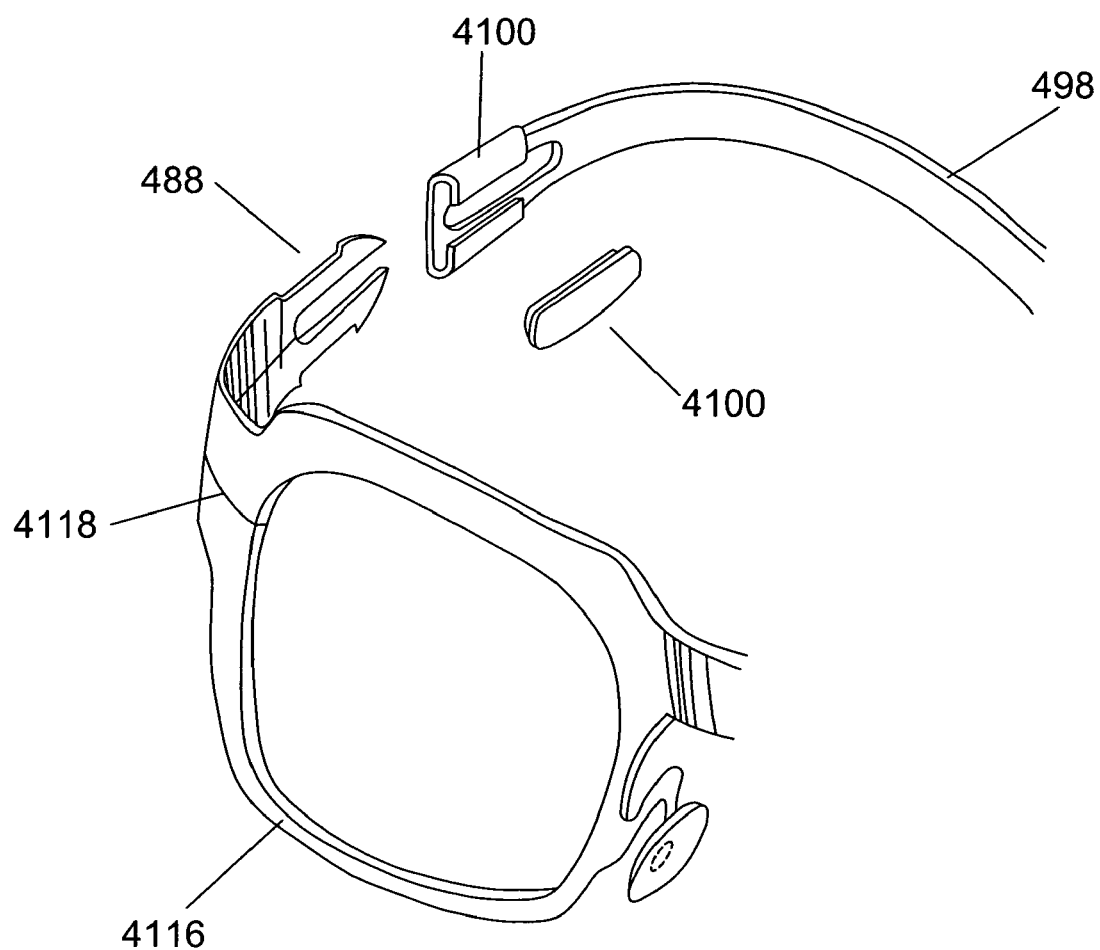
FIG. 20 is a front perspective view corresponding to FIG. 19 but of the other side.

FIGS. 18 to 20 show a fifth embodiment where the rim 4116 of a front 4120 and the side member 488 are split by a common split 4118. In this way, the upper and lower members 490, 492 may be separated to open rim 4116 to enable lens 412 to be inserted into rim 4116; the members 490, 492 moved to the closed position shown; and the temple 498 engaged with the side member 488 as is described above in relation to the third embodiment. In this way, the temples 398 serve to not only secure themselves to the front 4120, but also serve to secure the rim 4116 in the closed position, thus securing the lens 4112 in the rim 4116.

Figure 21:
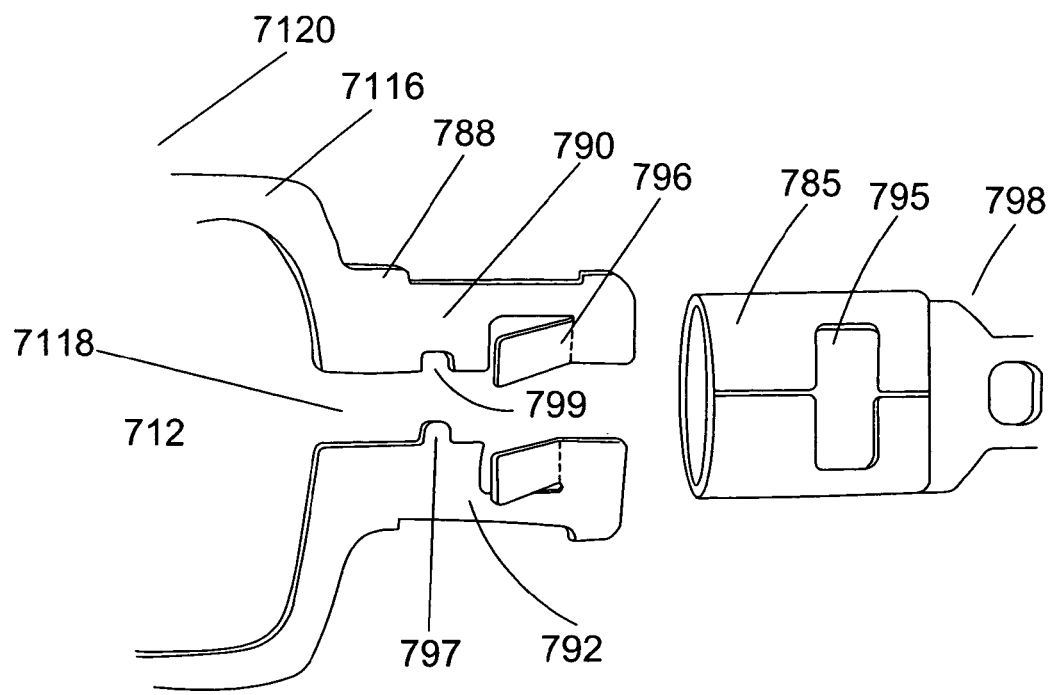
FIG. 21 is an enlarged side view of a sixth embodiment prior to assembly.
Figure 22:
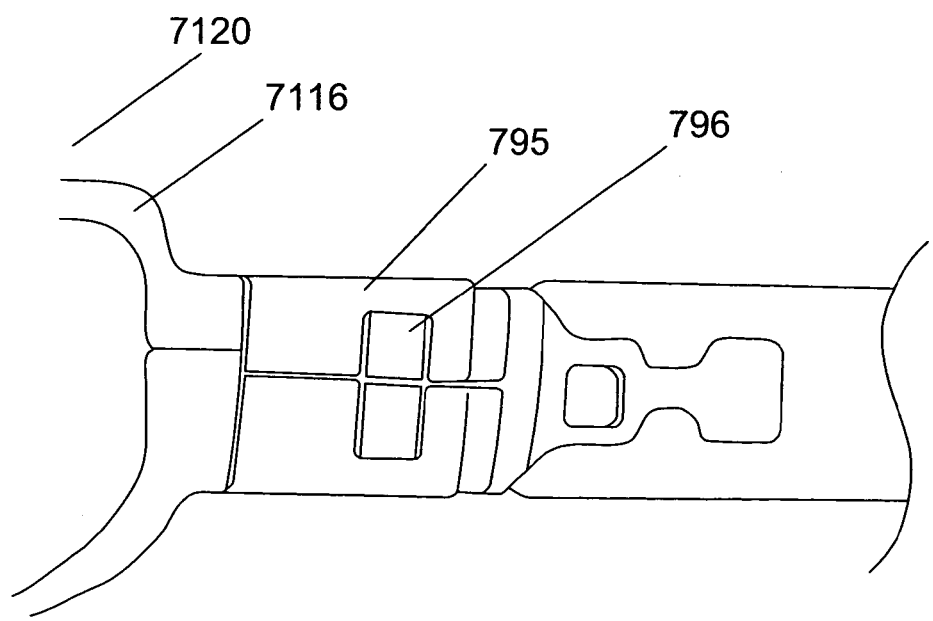
FIG. 22 is a view corresponding to FIG. 21 after assembly.
Figure 23:
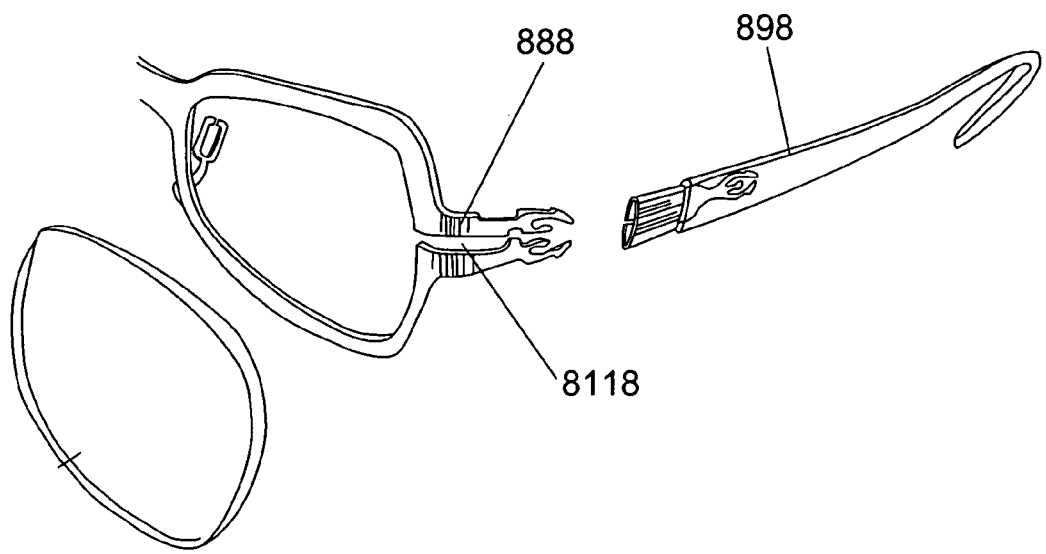
FIG. 23 is a partial front perspective view of a seventh embodiment prior to assembly.
Figure 24:
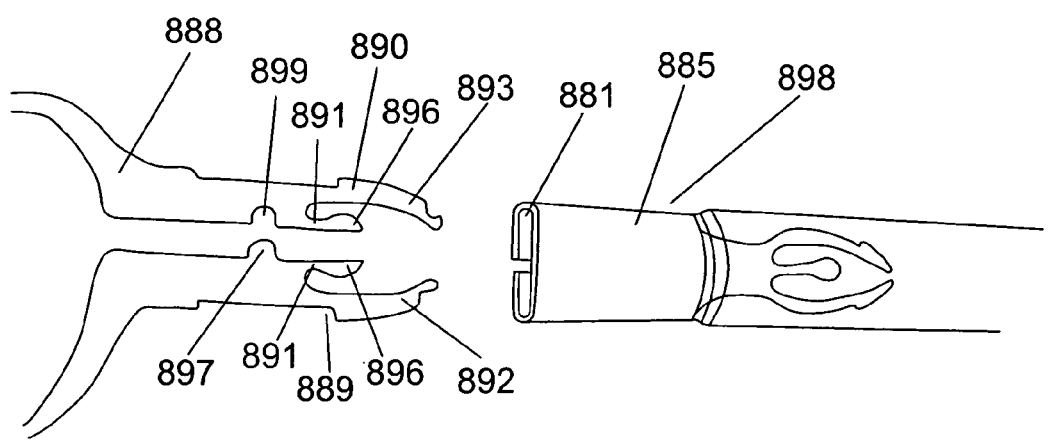
FIG. 24 is an enlarged side view of a front end and a temple of FIG. 23 prior to assembly.
Figure 25:
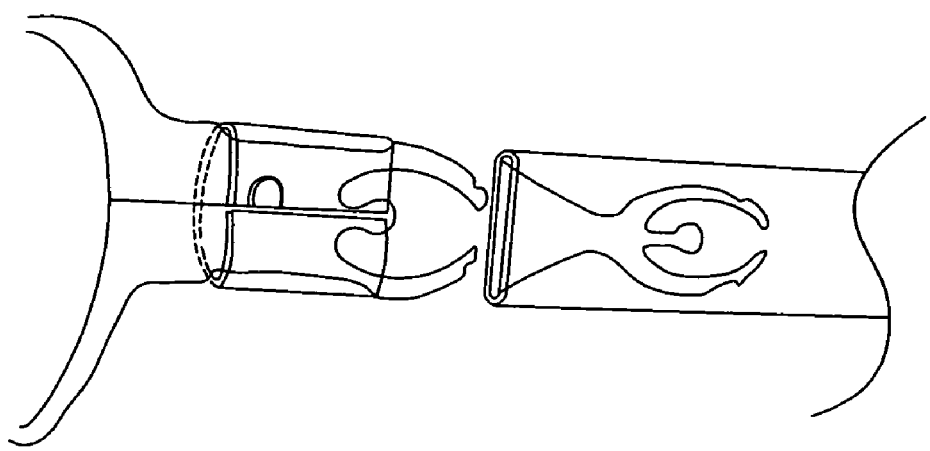
FIG. 25 is a view corresponding to FIG. 24 during assembly.
Figure 26:
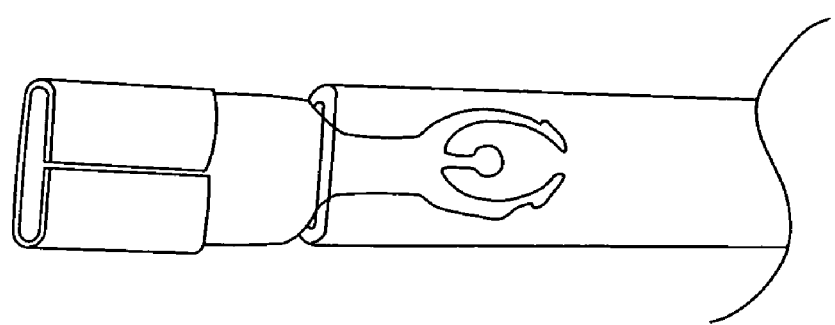
FIG. 26 is a view corresponding to FIG. 24 at the completion of assembly.

FIGS. 21 and 22 show a variation of FIGS. 18 to 20. Again, the rim 7116 of a front 7120 and side members 788 are split by a common split 7118. In this way, the upper and lower members 790, 792 may be separated to open rim 7116 to enable lens 712 to be inserted into rim 7116; the members 790, 792 moved to the closed position; and the temple 798 engaged with the side member 788. Here, the upper and lower members 790, 792 each has a barb 796 that extends laterally of the members 790, 792 and that are for releasably engaging in an opening 795 in temple 798.

In this way the side member 788 engaging the temple 798 is again used to secure lens 712 in rim 7116.

One of the members 790, 792 may have projection 797 that projects into split 7118, with the other member having a corresponding recess 799; the combination of projection 797 and recess 799 serving to axially or longitudinally locate the members 790, 792 to ensure correct alignment of rim 7116 and barb 796.

The temple 798 may have a shoe 785 in which the opening 795 is located. In this way different materials may be used for the shoe 785 and the temple 798 for strength and comfort to a user.

FIGS. 23 to 26 show a further variation where the side member 888 has a more complex shape. Here, there is the projection 897 and recess 899, but upper member 890 and lower member 892 are minor images of each other. Each of the members 890, 892 is arcuate in a convex manner (i.e. away from the split 8118), and each has at least one, preferably two, forward-facing ridges 893. Each also has a rearward-extending tongue 891 that has a shallow, curved barb 896 at its rear end. The upper edges of upper member 890 and lower edge of lower member 892 have recesses 889, as shown. This provides an end stop for positive engagement of side member 888 in temple 898.

The temple 898 has shoe 885 as well as a recess 881 corresponding in size and shape to side member 888. In this way the side member 888 can engage in recess 881, in the manner described above, and in the manner of a snap fit. Shoe 885 engages recesses 889 and end stop.

Figure 27:
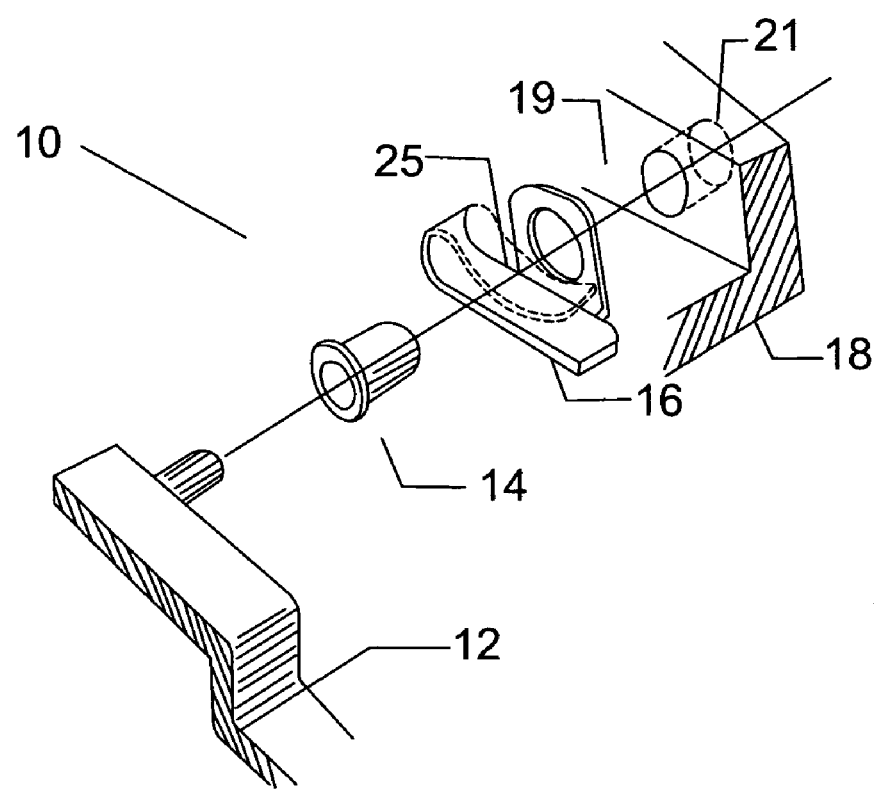
FIG. 27 is an exploded perspective view, partially cut away, of a portion of a spectacle frame assembly formed in another alternate embodiment of the present invention.

FIG. 27 shows a partial assembly of a spectacle frame assembly generally designated as 10 comprising a temple 12, a sleeve 14, a clip 16 and a front 18. The front 18 may be made of a material, for example, moulded plastics, acrylic or acetate. The front 18 has a recess 19 into which the clip 16 can be inserted. The clip 14 is preferably a spring clip.

After the clip 16 is inserted into the recess 19 within the frame 18, the sleeve 14 is inserted into each hole 26 in an arm of the clip 16 and into holes 21 in the front 18 and extending laterally of the recess 19. The temple 12 is fastened to the frame 18 by use of finger pressure exerted on the temple 12 such that pins 34 of the temple engage in sleeves 14, thereby securing the temple to the front 18, and securing the clip 16 to the front 18. Therefore, no adhesive or other fastener is required to secure the clip to the front, nor the temple to the clip and thus the front.

Figure 28:
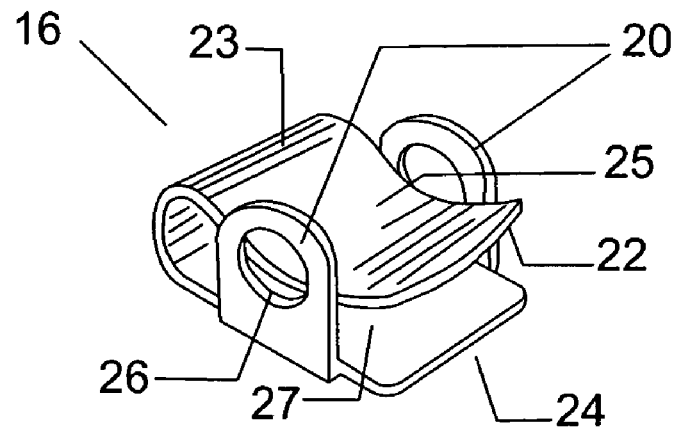
FIG. 28 is a perspective view illustrating a clip which may be employed in the assembly as shown in FIG. 27.

The clip 16 required to hold the assembly is shown in FIG. 28. The clip 16 is generally S-shaped with a base 24, a curved upper portion 23 integral with the base 24 and extending over the base 24, the curved upper portion terminating with an upturned lip 22. Prior to lip 22 is a curved recess 25. The base 24 has two arms 20 extending upwardly therefrom. The arms are preferably identical and aligned on either side of the base 24. Each arm 20 has a pin hole 26 extending through or into the arm 20. The pin holes 26 align with holes 21 when the clip 16 is inserted into recess 19. The base 24 and curved recess 25 form a slot 27 therebetween.

Figure 29:
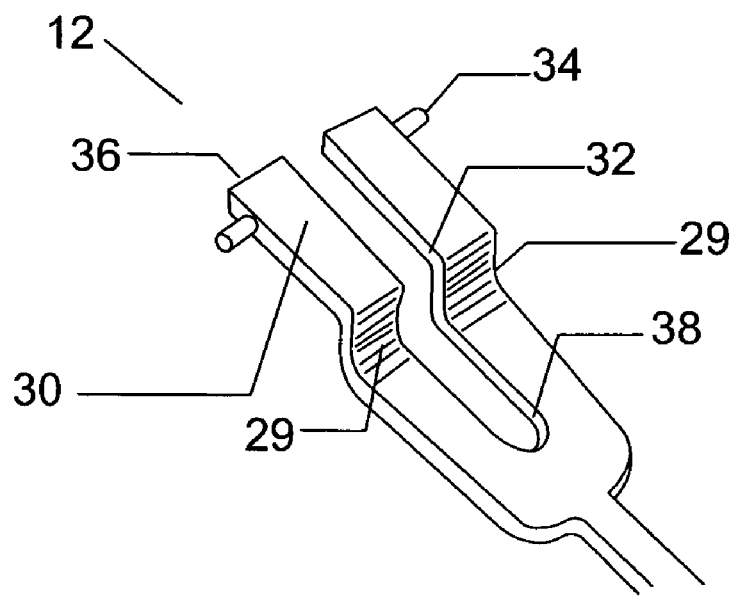
FIG. 29 is a perspective view, partially cut away, illustrating a temple which may be employed in the assembly as shown in FIG. 27.

FIG. 29 illustrates the temple 12 used in the frame assembly in FIG. 27. The temple 12 comprises two spaced apart and generally parallel arms 30, a slot 32 between the arms 30 and two pins 34 extending outwardly or laterally from the arms 30 adjacent the ends 36 thereof 34 for fastening the temple 12 with the clip 16. The slot 32 extends rearward from temple end 36 to an inner end 38. The temple may further include a temple end offset portion 29 offset inwardly of the temple end, the slot 32 extending rearward beyond the temple end offset portion 29, the slot 32 tapering in height from the temple end 36 for at least the full extent of the temple end offset portion 29.

Figure 30:
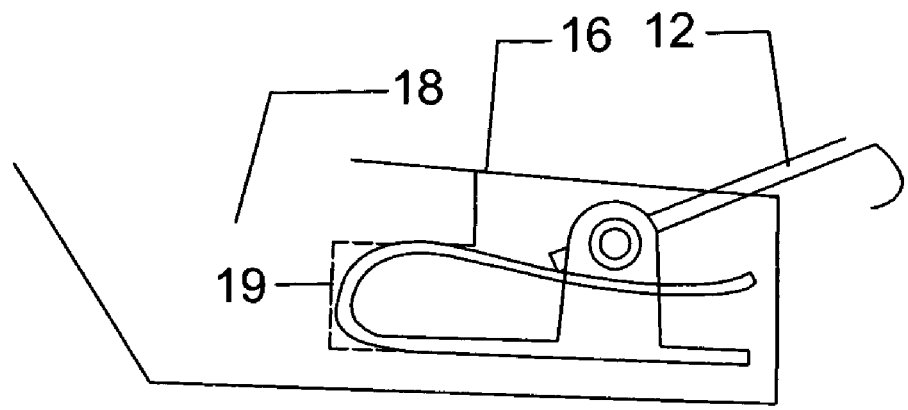
FIG. 30 is a schematic elevational view, illustrating a portion of the assembly as shown in FIG. 27 during use.

In FIG. 30, when finger pressure is applied on the arms 30 of temple 12 during assembly of the frame, the slot 32 is compressed and the temple 12 can be inserted into the clip 16 and located in the sleeves 14 previously placed in holes 26 and 21. This enables pins 34 to engage the sleeves 14 in the pin holes 21 of the front. By having the temple 12 of a resilient material such as, for example, high tensile strength stainless steel, on release of finger pressure the slot 32 resumes its normal height and pins 34 fully engage in sleeves 14 located in holes 26 of the clip 16 and pin holes 21 of the frame assembly. The clip 16 of a resilient material such as, for example, spring steel, and exerts a force on the temple 12 to secure the pins 34 of the temple 12 to the front.

Figure 31:
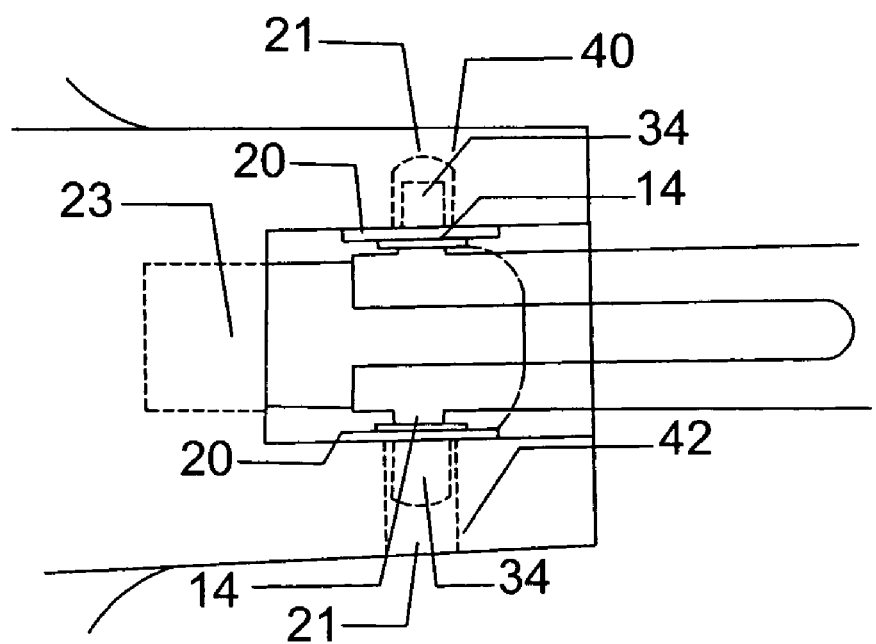
FIG. 31 is a schematic plan view illustrating a portion of the assembly as shown in FIG. 27 during use.

Removal is the reverse procedure. The temple 12 can therefore pivot about pins, with pins 34 and sleeves 14 acting as a hinge. The temple end 36 contacts curved upper portion 23 to provide a spring effect. When the temple is in the position shown in FIG. 31 (the "in use" position) the temple ends 36 do not contact the curved upper portion 23. As the temple 12 is pivoted about pins 34, the temple end 36 contacts the curved upper portion 23 to provide a resistance to movement (FIG. 30). When the temple 12 is pivoted such that it locates in recessed portion 25, there is little or no resistance to movement. This is when the temples 12 are in the folded position. Therefore, the curved nature of upper portion 23 and lip 22 provides a cam or spring effect with temple ends 36.

Figure 32:
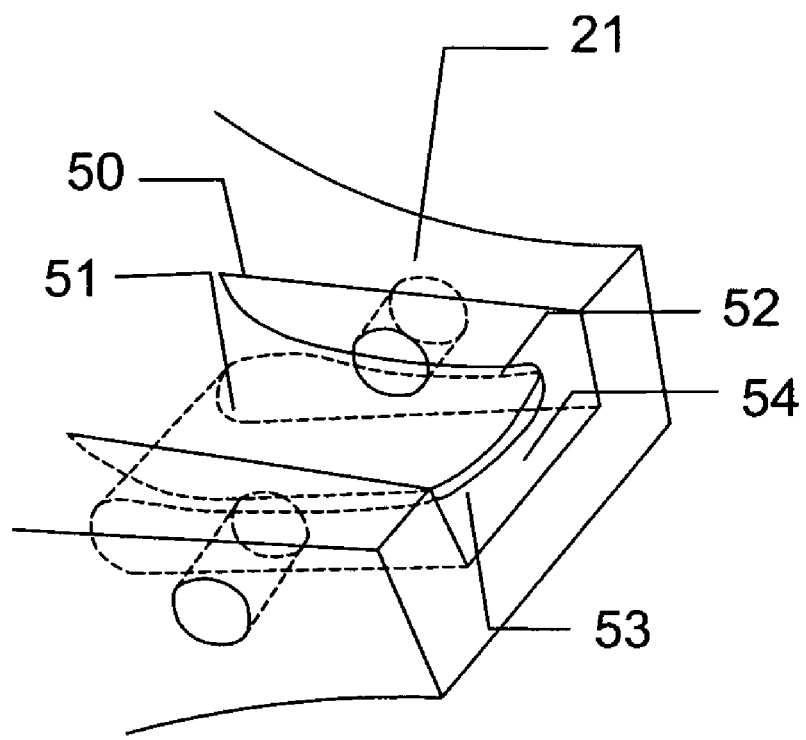
FIG. 32 is a perspective view, partially cut away, illustrating an integrally formed embodiment of a portion of the assembly as shown in FIG. 27.
Figure 33:
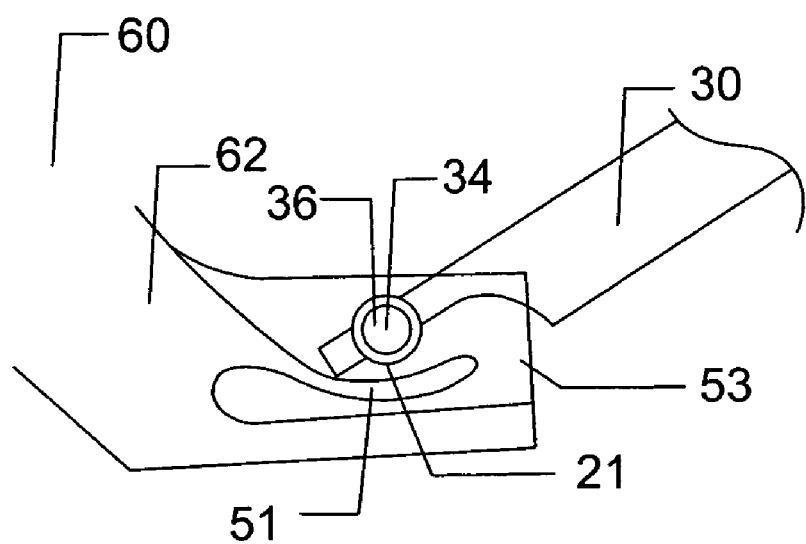
FIG. 33 is a schematic elevational view, illustrating a portion of the assembly as shown in FIG. 32 during use.

FIGS. 32 and 33 illustrates a perspective view of the injection moulded front 50 according to a final embodiment. An injection moulded front 50 comprises an integral curved upper portion 51 similar to curved upper portion 23 and having the same function. It also has an upturned lip 52, it is located in a recess 53 in the front 50. The recess 53 has a base 54. When no force is applied on the curved portion 51, the pins 34 cannot be inserted into the pin holes 21. When a compressive force is applied on the upper portion 51 by temple ends 36, the upper portion 51 will deflect towards the base 54 to enable the pins 34 to be inserted into holes 21. Sleeves 14 may be used if required or desired.

By integrating the clip with the front as a single injection moulded part, the invention minimizes the number of parts that the optician needs to assemble and reduces the need for the optician to use special tools to secure parts during assembly.

Whilst there has been described in the foregoing description preferred embodiments of the present invention, it will understood by those skilled in the art that many variations or modifications in details of design, construction and operation may be made without departing from the present invention as defined in the claims.

The invention claimed is:

1. A spectacle frame comprising a front and a pair of temples, the front having a side member at each end thereof; each side member comprising an engagement member for releasably yet securely engaging with a receptor of the temple for enabling the temple to be releasably attached to the front; one of the engagement member and the receptor being bifurcated and comprising an upper member and a lower member with a gap therebetween, and the other of the engagement member and the receptor defining a sidewall portion having an upper bracket extending from an upper edge thereof for releasably yet securely receiving the upper member and a lower bracket extending from a lower edge thereof for releasably yet securely receiving the lower member, the upper and lower brackets respectively terminating at longitudinally extended L-shaped edge projections spaced one from the other for open access to the sidewall portion therebetween.

2. The spectacle frame as claimed in claim 1, wherein the front further comprises a split rim, the rim being split at the side member, the side member also being split in alignment with the split in the rim along a common split line for enabling the rim to be opened along the split for the insertion and removal of a lens.

3. The spectacle frame as claimed in claim 2, wherein the receptor retains the split rim in a fully closed position when the engagement member is located in the receptor.

4. A spectacle frame comprising:
  (a) a front;
  (b) a side member at each end of the front;
  (c) a pair of rims to which the side members are attached;
  (d) each rim and side member being split along a common split line for enabling the rim to be opened along the split line for the insertion and removal of a lens; and
  (e) a pair of temples, each for engagement with one of the side members for retaining the common split line closed;
  wherein the engagement of each of the pair of temples with one of the side members is by an engagement member for releasable yet secure engagement with a receptor; one of the engagement member and the receptor is bifurcated and comprises an upper member and a lower member with a gap therebetween, and the other of the engagement member and the receptor has an upper bracket for releasably yet securely receiving the upper member and a lower bracket for releasably yet securely receiving the lower member;
  wherein each of the upper and lower members includes first and second barbs formed thereon for retentively engaging corresponding portions of one of said upper and lower brackets.

5. The spectacle frame as claimed in claim 4, wherein each side member comprises the engagement member for releasable yet secure engagement with the receptor of the temple.

6. The spectacle frame as claimed in claim 4, wherein each temple comprises the engagement member for engagement with the receptor of the side member.

7. The spectacle frame as claimed in claim 4, wherein the upper member and the lower member each has at least one barb at an end thereof remote from the front.

8. The spectacle frame as claimed in claim 4, wherein the receptor further comprises an elongate slot passing through the receptor between the upper bracket and the lower bracket.

9. The spectacle frame as claimed in claim 4, further comprising a button for engaging the elongate slot and the gap in the manner of a snap fit.

10. The spectacle frame as claimed in claim 9, wherein the upper member and the lower member are movable relative to each other from a first engaging position where the barbs engage the receptor, to a second position for enabling the engagement member to be inserted into and released from the receptor.

11. The spectacle frame as claimed in claim 10, wherein the button engages the gap to prevent the movement of the upper and lower members.

12. The spectacle frame as claimed in claim 7, wherein the side member extends rearward of the front.

13. The spectacle frame as claimed in claim 4, wherein one of the upper member and the lower member comprises a projection extending upwardly into a recess of the other of the upper member and the lower member for axially locating the upper member and the lower member.

* * * * *